United States Patent
Bieber

(10) Patent No.: US 9,889,641 B2
(45) Date of Patent: Feb. 13, 2018

(54) HOT-STAMPING MACHINE

(71) Applicant: LEONHARD KURZ Stiftung & Co. KG, Furth (DE)

(72) Inventor: Reinhard Bieber, Rohr (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 0 days.

(21) Appl. No.: 14/435,890

(22) PCT Filed: Oct. 24, 2013

(86) PCT No.: PCT/EP2013/072317
§ 371 (c)(1),
(2) Date: Apr. 15, 2015

(87) PCT Pub. No.: WO2014/064216
PCT Pub. Date: May 1, 2014

(65) Prior Publication Data
US 2015/0266288 A1    Sep. 24, 2015

(30) Foreign Application Priority Data
Oct. 25, 2012 (DE) .......................... 10 2012 110 222

(51) Int. Cl.
| | | |
|---|---|---|
| B41F 16/00 | (2006.01) | |
| B29C 65/78 | (2006.01) | |
| B29C 65/80 | (2006.01) | |
| B65H 41/00 | (2006.01) | |
| B41F 19/06 | (2006.01) | |
| B21D 37/16 | (2006.01) | |

(52) U.S. Cl.
CPC ............ *B41F 16/002* (2013.01); *B21D 37/16* (2013.01); *B41F 16/0026* (2013.01);
(Continued)

(58) Field of Classification Search
CPC .... B41F 16/00; B41F 16/006; B41F 16/0026; B41F 16/002; B41F 19/062; B41F 19/22;
(Continued)

(56) References Cited

U.S. PATENT DOCUMENTS 2,798,010 A * 7/1957 Bender ................ H01J 9/04
                                                                313/346 R
6,202,549 B1   3/2001 Mitsam et al.
(Continued)

FOREIGN PATENT DOCUMENTS

| DE | 69705962 | 4/2002 |
|---|---|---|
| DE | 10159661 | 2/2003 |

(Continued)

*Primary Examiner* — R. A. Smith
*Assistant Examiner* — John M Royston
(74) *Attorney, Agent, or Firm* — Hoffmann & Baron, LLP

(57) ABSTRACT

A hot-stamping device (1) is described, having a stamping device (2) for transferring a transfer layer (15*u*) disposed on a carrier layer (15*t*) of a hot-stamping foil (15) onto a substrate (14). The hot-stamping device comprises a heatable stamping roller (11) and a counter-pressure roller (12), between which a stamping gap (16) is realized, in which a stamped substrate (17) is realized, and comprising a separating device (3), disposed downstream, for separating the carrier layer (15*t*) from the stamped substrate (17). The separating device (3) has a separating element (20), which is realized as a bar-shaped hollow body, disposed on which there is a supply for a compressed gas (21). At least one longitudinal edge of the separating element (20) is realized as a perforated separating edge (20*k*) having outflow openings (20*a*) for the compressed gas (22), for the purpose of realizing a gas cushion between the carrier layer (15*t*) and the separating element (20). The separating edge (20*k*) is disposed transversely in relation to the running direction and parallelwise in relation to the top side of the coated substrate (17).

22 Claims, 2 Drawing Sheets

(52) U.S. Cl.
CPC ............ *B41F 19/062* (2013.01); *B29C 65/78* (2013.01); *B29C 65/80* (2013.01); *B41F 16/006* (2013.01); *B41P 2219/22* (2013.01); *B65H 41/00* (2013.01)

(58) Field of Classification Search
CPC ............... B65C 2009/009; B21D 37/16; B41P 2219/22
See application file for complete search history.

(56) References Cited

U.S. PATENT DOCUMENTS

| | | |
|---|---|---|
| 6,205,916 B1 | 3/2001 | Castleton |
| 6,681,828 B1* | 1/2004 | Clough et al. ................ 156/767 |
| 2003/0017094 A1* | 1/2003 | Fischer et al. ................ 422/192 |
| 2008/0295969 A1* | 12/2008 | Ohsawa ........................ 156/540 |
| 2012/0152444 A1 | 6/2012 | Weber |
| 2013/0168024 A1* | 7/2013 | Bernhard .................. B65C 9/28 156/497 |

FOREIGN PATENT DOCUMENTS

| | | |
|---|---|---|
| EP | 1997631 | 12/2008 |
| JP | H0640060 | 2/1994 |
| JP | 06059363 | 8/1994 |
| JP | H08318614 | 12/1996 |
| JP | 2009006703 | 1/2009 |
| WO | WO9413487 | 6/1994 |
| WO | WO0016980 | 3/2000 |

\* cited by examiner

HOT-STAMPING MACHINE

This application claims priority based on an International Application filed under the Patent Cooperation Treaty, PCT/EP2013/072317, filed on Oct. 24, 2013, and German Application No. DE 102012110222.8, filed on Oct. 25, 2012.

BACKGROUND OF THE INVENTION

The invention relates to a hot-stamping device according to the preamble of the subject-matter of claim 1.

Hot-stamping devices are used to transfer a transfer layer disposed on a carrier layer of a hot-stamping foil onto a substrate by the action of temperature and pressure. For this, a heated stamping roller is provided, which acts in combination with a counter-pressure roller. By means of a separating apparatus, the carrier layer is drawn off, downstream after a stamping gap realized between the stamping roller and the counter-pressure roller, from the transfer layer that is transferred onto the substrate. If a profiled stamping roller is used, and/or in the case of use of an adhesive layer that is applied to the substrate only in certain regions of the surface, and to which the transfer layer adheres in regions of the surface, corresponding to the layout of the adhesive layer, only regions of the transfer layer are transferred onto the substrate (corresponding to profiling of the stamping roller and/or corresponding to the layout of the adhesive layer), with the result that the drawn-off carrier layer may also have residues of the transfer layer.

A hot-stamping device of the type described is known from DE 10159661 C1.

In the separating device, the carrier layer that is to be separated runs over a separating edge, wherein the surfaces that enclose or adjoin the separating edge are inclined at a separating angle in relation to the support plane of the substrate. The separating edge must have a small radius, i.e. it must be realized as a sharp edge. The magnitude of the separating angle depends on the thickness and stiffness of the substrate. The less stiff the substrate is, the greater the separating angle must be in order to prevent the substrate from being pulled up and/or carried along together with the carrier layer. This also applies to the transfer of the transfer layer in the form of small or fine motifs, i.e. motifs that have fine line thickness and/or extremely fine details in the layout, in particular in the peripheral regions of the surface regions of the transfer layer transferred onto the substrate.

During operation of the hot-stamping device, the separating edge of the separating device becomes soiled, wherein, in particular, electrostatic charges of the carrier layer, realized as a plastic film, are instrumental in the accumulation of particles of dust and dirt at the separating edge. Owing to the soiling of the separating edge, over time the friction at the separating edge increases to such a great extent that it is necessary to interrupt the operation of the hot-stamping device and manually clean the separating edge.

SUMMARY OF THE INVENTION

The object of the present invention is to specify a hot-stamping device that enables the hot-stamping device to be operated continuously in a faultless manner.

According to the invention, this object is achieved with the subject-matter of claim 1. A hot-stamping device is described, having a stamping device for transferring a transfer layer disposed on a carrier layer of a hot-stamping foil onto a substrate, comprising a heatable stamping roller and a counter-pressure roller, between which a stamping gap is realized, in which a stamped substrate is realized, and comprising a separating device, disposed downstream, for separating the carrier layer from stamped substrate, wherein it is provided that the separating device has a separating element, which is realized as a bar-shaped hollow body, disposed on which there is a supply for a compressed gas, and at least one longitudinal edge of the separating element is realized as a perforated separating edge having outflow openings for the compressed gas, for the purpose of realizing a gas cushion between the carrier layer and the separating edge.

The hot-stamping device according to the invention has the advantage that the separated carrier layer slides over the separating edge on a gas cushion, and consequently abrasion no longer occurs. Particles of dust and dirt are kept away from the separating edge by the flowing gas cushion. Further, the separating edge is cooled in an effective manner by the flowing gas, with the result that overheating of the separating edge is avoided.

Preferably, air or nitrogen may be provided as compressed gas.

It may be provided that the separating edge is disposed transversely in relation to the running direction and parallelwise in relation to the top side of the coated substrate.

The separating element may have a polygonal cross-section.

It may be provided, in an advantageous realization, that the separating element has a rectangular cross-section. However, a triangular or hexagonal cross-section, for example, may also be provided.

It may be provided that the separating edge has through-holes that open into the outlet openings.

The separating edge may be realized as a rounded edge having an edge radius. Advantageously, the edge radius may be in the range of from 1 mm to 10 mm.

The through-holes may be realized as drilled holes having a drilled-hole radius that is smaller than the edge radius of the separating edge.

It may be provided, in an advantageous realization, that the drilled-hole radius is 20% smaller than the edge radius of the separating edge.

Further, the through-holes may be realized as slots having a slot width that is smaller than the edge radius of the separating edge.

It may be provided, in an advantageous realization, that the slot width is 20% smaller than the edge radius of the separating edge.

It may also be provided that the separating element is made of a sintered material having open pores, wherein the open pores constitute the through-holes and wherein the open pores are sealed with a lacquer coating or the like in the regions outside of the separating edge. The sintered material may be a ceramic or a metallic material.

In order to realize a uniform gas cushion, it may be provided that the through-holes are uniformly distributed over the surface area of the separating edge.

It may be provided, in an advantageous realization, that the area ratio of the total area of the outflow openings at the separating edge to the closed remaining area of the separating edge is 50:50%.

Further, it may be provided that the pressure of the compressed gas is in the range of from 1 bar to 6 bar, preferably in the range of from 1 bar to 3 bar.

The pressure of the compressed gas may be selected such that a gas cushion, having a thickness in the range of from 1 µm to 100 µm, is realized between the surface of the separating edge and the surface of the carrier layer that faces towards the separating edge.

The separating element may be disposed downstream after the stamping roller, at a horizontal axial distance of from 200 mm to 300 mm, preferably at a horizontal axial distance of from 280 mm to 295 mm. This distance depends on the cooling time required by the composite, of substrate and hot-stamping foil, after the hot-stamping operation. The cooling time is required to enable a high-quality stamping result to be achieved. A high-quality stamping result includes, in particular, adequate adhesion of the transfer layer on the substrate, and a defined separation of the transfer layer at the surface edges of the layout. The required duration of this cooling time depends on a multiplicity of parameters, in particular speed of the hot-stamping operation, fineness of the structures in the stamping layout, structure and chemical/physical properties of the hot-stamping foil.

It may be provided that the vertical distance in relation to the underside of the stamped substrate and/or the angle of inclination of the separating element can be set. The vertical distance may be measured from the top side of the separating edge to the underside of the stamped substrate.

The vertical distance may be in the range of from 0.2 mm to 5 mm, preferably in the range of from 1.5 mm to 3 mm.

The separating element may be realized so as to be pivotable by +−15° about a rotation axis, parallelwise in relation to the longitudinal axis of the separating element. The end portion of the connecting piece on the output side, for example, may be provided as a pivot bearing.

BRIEF DESCRIPTION OF THE DRAWINGS

The invention is now explained more fully with reference to embodiment examples. There are shown in FIG. 1 a first embodiment example of the hot-stamping device according to the invention, in a schematic representation.

DETAILED DESCRIPTION OF THE INVENTION

Figure 1:
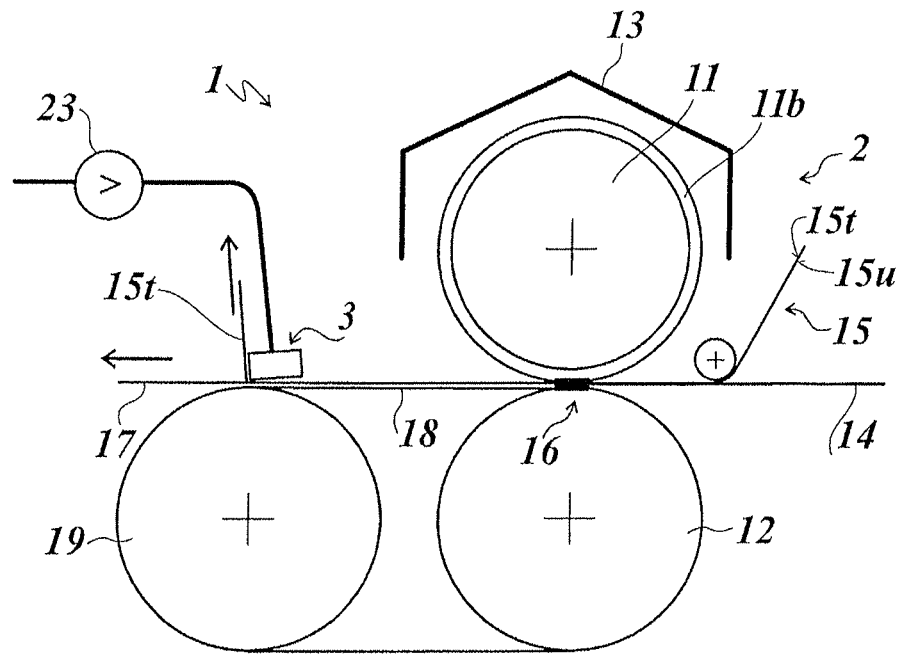

FIG. 1 shows a hot-stamping device 1 comprising a stamping device 2 and a separating device 3. The stamping device 2 comprises a stamping roller 11, a counter-pressure roller 12 and a heating apparatus 13.

On its external circumference, the stamping roller 11 has a coating 11b of an elastomer. The elastomer is preferably silicone rubber. The counter-pressure roller 12 is made of steel.

The heating apparatus 13 is disposed above the stamping roller 11 and, in the embodiment example represented in FIG. 1, is realized as infrared radiation heating controlled by means of a temperature controller.

Supplied upstream before the stamping device 2 are a substrate 14 to be stamped and a hot-stamping foil 15, which are joined together in a stamping gap 16 realized between the stamping roller 11 and the counter-pressure roller 12, with a stamping pressure being formed.

The hot-stamping foil 15 has a transfer layer 15u disposed on a carrier layer 15t. The carrier layer 15t may be made, for example, of PET or of polypropylene, polystyrene, PVC, PMMA, ABS, polyamide. The hot-stamping foil 15 is disposed such that the transfer layer 15u faces towards the top side of the substrate 14 to be stamped. The transfer layer 15u may be coated with an adhesive layer that can be activated by heat, or it may be realized to be self-adhesive (cold adhesive). A parting layer, which facilitates the separation of the transfer layer 15u from the carrier layer 15t, may be disposed between the transfer layer 15u and the carrier layer 15t.

The transfer layer of the hot-stamping foil generally has a plurality of layers, in particular a separation layer (for example, of wax or compounds containing wax), a protective lacquer layer, an adhesive layer that can be activated by heat. It may additionally contain one or more decoration layers and/or functional layers, applied over part of the surface or over the entire surface. Decoration layers are, for example, colored (opaque or transparent or translucent) lacquer layers, metallic layers or relief structures (haptic or optically refractive or optically diffractive in their effect). Functional layers are, for example, electrically conducting layers (metal, ITO (ITO=indium tin oxide)), electrically semiconducting layers (for example, semiconductor polymers), or electrically non-conducting layers (electrically insulating lacquer layers), or layers that are optically matt or anti-reflective in their effect (for example, having microscopic matt structures), or structures that modify the adhesion action and/or the surface tension (lotus-effect structures or similar). Additional auxiliary layers, in particular adhesion promoting layers, may be provided between the individual layers. The individual layers of the transfer layer are approximately between 1 nm and 50 µm thick.

The substrate 14 to be stamped is preferably a flexible substrate, for example paper having a weight per unit area of 30 g/m² to 350 g/m², preferably 80 g/m² to 350 g/m², cardboard, plastic or a hybrid material or a laminate.

A stamped substrate 17, which is still joined to the carrier layer 15t, is realized as a result of the transfer layer 15u being transferred onto the substrate 14.

The width of the stamping gap 16 is determined substantially by the stamping pressure and by the local deformation of the coating 11b of the stamping roller 11 that occurs under the stamping pressure. The values to be set for pressure, temperature and speed of advance depend on numerous parameters, such as the material properties of the hot-stamping foil used, the stamping decor and the material properties of the substrate.

The carrier layer 15t is separated from the stamped substrate 17 in the separating device 3 disposed downstream after the stamping device 2. The structure and operation of the separating device 3 are described further below in FIG. 2. The separating device 3 is disposed above the stamped substrate 17 that is joined to the carrier layer 15t. The separated carrier layer 15t supplied to a wind-up reel, not represented.

A seamless belt 18 is disposed under the stamped substrate 17, between the stamping gap 16 and the separating device 3. The seamless belt 18 forms a rigid bearing apparatus that overlaps the stamping gap 16. The seamless belt 18 is guided on the counter-pressure roller 12 and a return roller 19, wherein the bearing distance of the counter-pressure roller 12 and the return roller 19 is set such that the belt 18 is subjected to such a tensile force that it forms a rigid, flat support surface for the coated substrate 17.

Transport devices, and supply and wind-up reels for the substrate 14, 17 and the hot-stamping foil 15, or the carrier layer 15t, are not represented in the embodiment examples represented in FIG. 1. It may be provided that the hot-stamping device 1 is a production station in a production facility operating according to the reel-to-reel principle. The substrate may be processed according to the reel-to-reel principle, i.e. wound off endlessly from a reel, then processed, and then wound up again. The substrate may also be processed as sheets, wherein the individual sheets are supplied from a stack and, after processing, are again collected on a stack. The hot-stamping foil is usually processed according to the reel-to-reel principle, i.e. wound off endlessly from a reel, then processed, and then would up again.

Figure 2:
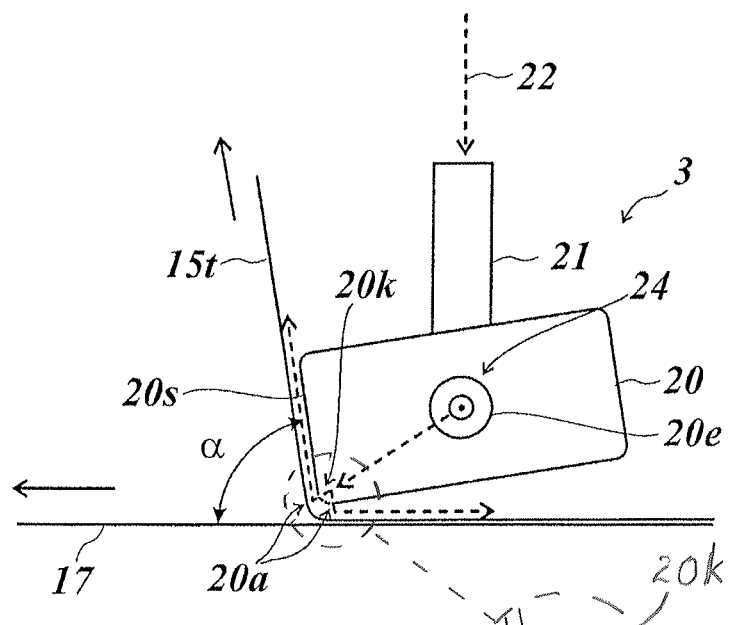
FIG. 2 a separating device of the hot-stamping device in FIG. 1, in a schematic representation.
Figure 2:
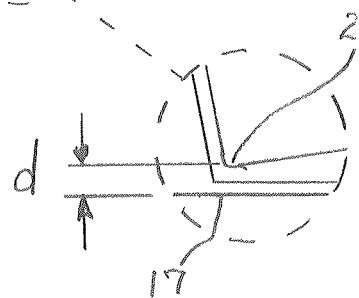

FIG. 2 shows the structure of the separating device 3 in detail.

The separating device 3 comprises a separating element 20 and a connecting piece 21 for supplying a compressed gas, preferably compressed air 22.

The separating element 20 is realized as a bar-shaped hollow body, which has a rectangular cross-section in the embodiment example represented in FIG. 2. A different cross-section may also be provided, however, for example a triangular or hexagonal cross-section. It is essential that at least one longitudinal edge is realized, as a perforated separating edge 20k having outflow openings 20a, on the separating element 20, and that at least one inflow opening 20e, with which the output of the connecting piece 21 is connected in a gas-tight manner, is provided. The separating edge 20k is preferably realized as a rounded edge having an edge radius. The edge radius may be, for example, in the range of from 1 mm to 10 mm. The separating edge 20k is disposed transversely in relation to the running direction and parallelwise in relation to the top side of the coated substrate 17. The separating element 20 is disposed downstream after the stamping roller 11, at a horizontal axial distance of from 200 mm to 300 mm, preferably 280 mm to 295 mm, and at a vertical distance d of from 0.2 mm to 5 mm, preferably 1.5 mm to 3 mm, in relation to the underside of the stamped substrate 17.

The inlet of the connecting piece 21 is connected to a compressor 23, represented schematically in FIG. 1, which provides the compressed air 22. The compressed air 22 flowing into the inflow opening of the separating element 20 flows out of the outflow openings 20a disposed along the separating edge 20k, wherein an air cushion is built up between the surface of the separating edge 20k and the back side of the carrier layer 15t, which is preferably realized as a plastic film.

The outflow openings 20a may be, for example, drilled or made by means of lasers. The more uniform the distribution of the outflow openings 20a on the surface of the separating edge 20k is, the more uniform and homogeneous the air cushion also is.

The expedient size, shape and arrangement of the openings made depend on various factors, for example thickness of the substrate to be stamped, thickness of the hot-stamping foil used and edge radius of the separating edge 20k.

It has proved successful to realize the outflow openings 20a as drilled holes having a drilled-hole radius that is smaller than the edge radius of the separating edge 20k. Preferably, the drilled-hole radius is 20% smaller than the edge radius of the separating edge 20k.

It may also be provided to realize the outflow openings 20a as slots. In this case, it has proved successful to make the width of the slots 20% smaller than the edge radius of the separating edge 20k.

Further, the separating element 20 may also be made of a porous sintered material, in which sinter pores constitute the outflow openings 20a. In this case, the sinter pores are to be sealed with a lacquer coating or the like in the regions outside of the separating edge 20k.

In the case of the aforementioned embodiments, the area ratio of the total area of the outflow openings 20a to the closed remaining area of the separating edge 20k should be 50:50%.

The pressure of the compressed air 22 may be settable, preferably controllable by closed-loop control, from 1 bar to 6 bar. The pressure is preferably in the range of from 1 bar to 3 bar. The pressure is to be set such that the stamping foil only just "floats" on the air cushion. This is the case if there is an air gap in the range of from 1 µm to 100 µm.

The pressure that is to be set depends on the stamping speed, the separating tensile force and the separating width of the hot-stamping foil, or of the substrate.

The compressed air flowing out of the outflow openings 20a of the separating edge 20k also advantageously removes heat from the separating edge 20k, which heat is introduced by the stamped substrate 17, which is still warm. This cooling effect prevents the carrier layer 15t, separated from the substrate, from melting onto the separating edge after prolonged continuous operation, i.e. it prevents it from becoming too soft and, as a result, remaining stuck to, or rubbing excessively on, the separating edge 20k or other regions of the separating element 20.

It may be provided to control the temperature of the compressed air 22, by closed-loop control, such that the temperature of the separating edge 20k assumes a defined value that is stable over a long period, for example in the range of from 10° C. to 40° C., preferably in the range of from 15° C. to 30° C.

As shown by FIG. 2, the separated carrier layer 15t is drawn off at a separating angle α in relation to the top side of the stamped substrate 17. The carrier layer 15t runs parallelwise in relation to an end face of the separating element 20, wherein a gap, defined by the air cushion, is realized between the end face and the carrier layer 15t. In the embodiment example represented in FIG. 2, the separating angle α is an acute angle. The separating angle α in this case is enclosed by the support surface of the substrate 17 and the end face 20s of the separating element 20 that adjoins the separating edge 20k in the downstream direction.

Figure 3:
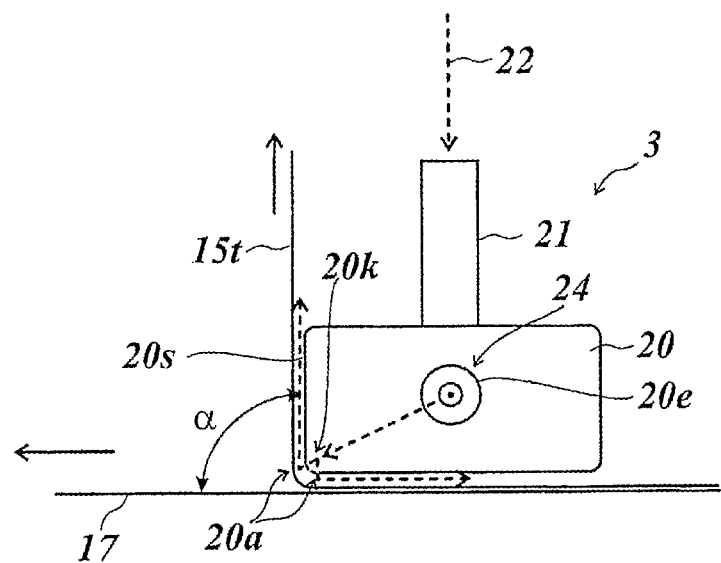
FIG. 3 a second embodiment example of the separating device in FIG. 2.

In the embodiment example represented in FIG. 3, the separating angle α is a right angle.

The separating angle α can be set by means of a pivot bearing 24, the rotation axis of which runs parallel to the longitudinal axis of the separating element 20. In the embodiment examples represented in FIGS. 2 to 4, the pivot bearing 24 is provided, exemplarily, on the end portion of the connecting piece 21 on the output side. Advantageously, the separating element 20 may be realized so as to be pivotable by +−15°.

Figure 4:
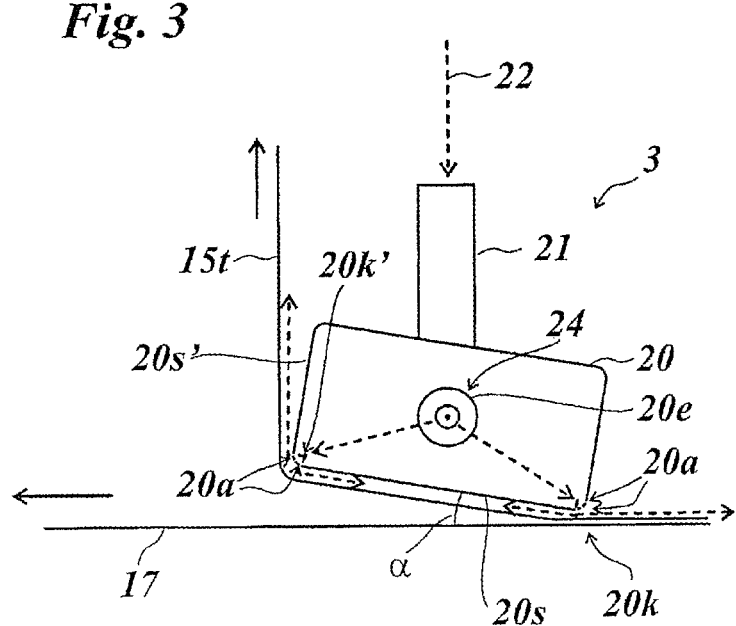
FIG. 4 a third embodiment example of the separating device in FIG. 2.

FIG. 4 shows an embodiment example in which the separating element 20 has a first separating edge 20k and a second separating edge 20k', which are disposed in succession in the direction of movement of the substrate 17. A relatively small (acute) separating angle α is set at the lower end face 20s that adjoins the first separating edge 20k. The separated carrier layer 15t is guided over a first air cushion, parallelwise in relation to the lower end face of the separating element 20 and, at the second separating edge 20k' that is disposed downstream after the first separating edge 20k, is drawn off perpendicularly in relation to the top side of the substrate 17. The second separating edge 20k' in this case acts as a deflection edge for the carrier layer 15t.

LIST OF REFERENCES

1 hot-stamping device
2 stamping device
3 separating device
3k separating edge
11 stamping roller
11b coating
12 counter-pressure roller
13 heating apparatus
14 substrate to be stamped
15 hot-stamping foil
15t carrier layer
15u transfer layer
16 stamping gap
17 stamped substrate
18 seamless belt
19 return roller
20 separating element
20a outflow opening
20e inflow opening
20k separating edge, first separating edge
20k' second separating edge
20s end face
21 connecting piece
22 compressed air
23 compressor
24 pivot bearing, or pivot point
α separating angle

The invention claimed is:

1. A hot-stamping device having a stamping device for transferring a transfer layer disposed on a carrier layer of a hot-stamping foil onto a substrate, comprising a heatable stamping roller and a counter-pressure roller, between which a stamping gap is realized, in which a stamped substrate is realized, and comprising a separating device, disposed downstream, for separating the carrier layer from the stamped substrate,
wherein the separating device has a separating element comprising, a bar-shaped hollow body having a first and second substantially planar surface meeting at a longitudinal separating edge, the separating element being connected to a supply for a compressed gas, and
wherein the separating element is perforated such that outflow openings for the compressed gas are formed in the first and second surfaces adjacent to and on opposite sides of the longitudinal separating edge, for the purpose of realizing a gas cushion between the carrier layer and the separating edge,
wherein the carrier layer is separated from the substrate in the separating device.

2. A hot-stamping device according to claim 1, wherein the separating edge is disposed transversely in relation to the running direction and parallelwise in relation to the top side of the coated substrate.

3. A hot-stamping device according to claim 1, wherein the separating element has a polygonal cross-section.

4. A hot-stamping device according to claim 3, wherein the separating element has a rectangular cross-section.

5. A hot-stamping device according to claim 1, wherein the separating edge has through-holes that open into the outlet openings.

6. A hot-stamping device according to claim 1, wherein the separating edge is realized as a rounded edge having an edge radius.

7. A hot-stamping device according to claim 5, wherein the through-holes are realized as drilled holes having a drilled-hole radius that is smaller than the edge radius of the separating edge.

8. A hot-stamping device according to claim 7, wherein the drilled-hole radius is 20% smaller than the edge radius of the separating edge.

9. A hot-stamping device according to claim 5, wherein the through-holes are realized as slots having a slot width that is smaller than the edge radius of the separating edge.

10. A hot-stamping device according to claim 9, wherein the slot width is 20% smaller than the edge radius of the separating edge.

11. A hot-stamping device according to claim 5, wherein the separating element is made of a sintered material having open pores, wherein the open pores constitute the through-holes and wherein the open pores are sealed with a lacquer coating in the regions outside of the separating edge.

12. A hot-stamping device according to claim 5, wherein the through-holes are uniformly distributed over the surface area of the separating edge.

13. A hot-stamping device according to claim 1, wherein the area ratio of the total area of the outflow openings to the closed remaining area is 50:50%.

14. A hot-stamping device according to claim 1, wherein the pressure of the compressed gas is in the range of from 1 bar to 6 bar.

15. A hot-stamping device according to claim 14, wherein the pressure of the compressed gas is selected such that a gas cushion, having a thickness in the range of from 1 μm to 100 μm, is realized between the surface of the separating edge and the surface of the carrier layer that faces towards the separating edge.

16. A hot-stamping device according to claim 1, wherein the separating edge is disposed downstream from the center of the stamping roller, at a horizontal axial distance of from 200 mm to 300 mm.

17. A hot-stamping device according to claim 1, wherein the vertical distance in relation to the underside of the stamped substrate and/or the angle of inclination of the separating element can be set.

18. A hot-stamping device according to claim 17, wherein the vertical distance is in the range of from 0.2 mm to 5 mm.

19. A hot-stamping device according to claim 17, wherein the separating element is realized so as to be pivotable by ±15° about a rotation axis, parallelwise in relation to the longitudinal axis of the separating element.

20. A hot-stamping device according to claim 1, wherein the perforated separating edge is disposed at a point of separation of the carrier layer and the stamped substrate.

21. A hot-stamping device having a stamping device for transferring a transfer layer disposed on a carrier layer of a hot-stamping foil onto a substrate and a separating device disposed downstream from the stamping device for separating the carrier layer from the stamped substrate, the stamping device comprising a heatable stamping roller and a counter-pressure roller, between which a stamping gap is realized, in which a stamped substrate is realized, and the separating device comprising:
a separating element comprising a bar-shaped hollow body, the hollow body including a perforated separating edge having outflow openings for providing a cushion of compressed gas between the carrier layer and the separating edge;

a connecting piece connected to the separating element for supplying a compressed gas to the outflow openings of the separating edge; and a pivot bearing defining an axis of rotation of the separating element whereby an angle of inclination of the separating element can be set.

22. A hot-stamping device according to claim 21, wherein the bar-shaped hollow body comprises a first and second planar surface meeting at the separating edge, the outflow openings for the compressed gas being formed in the first and second surfaces immediately adjacent to and on opposite sides of the separating edge.

* * * * *